Figure 1:
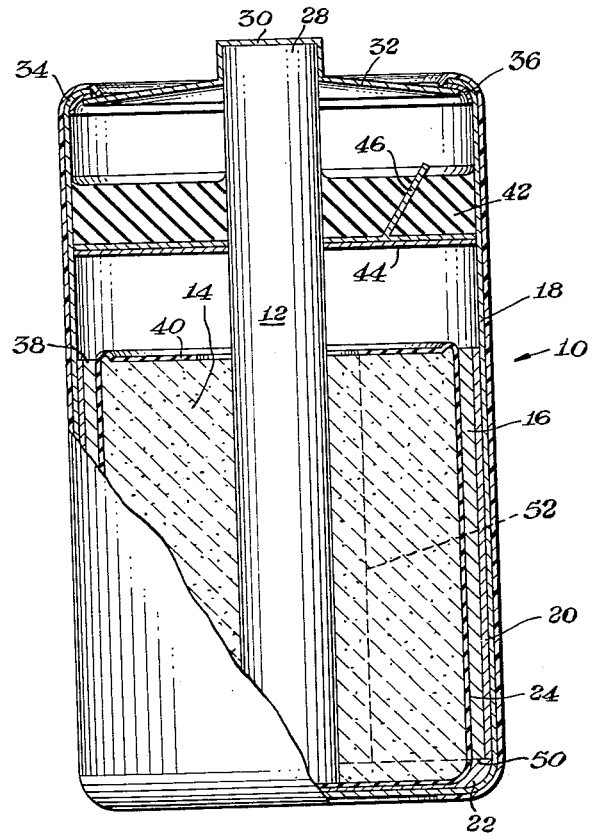

INVENTORS.
Lawrence Whitby
Harold A. Robinson
BY
Griswold & Burdick
ATTORNEYS

2,806,078

DRY CELL BATTERY

Lawrence Whitby, Bay City, and Harold A. Robinson, Midland, Mich., assignors to The Dow Chemical Company, Midland, Mich., a corporation of Delaware Application August 8, 1955, Serial No. 527,003

7 Claims. (Cl. 136—133)

This invention relates to an improved primary cell of the dry or nonspillable type, and particularly to dry cells in which the anode material is magnesium.

Dry cell formulations employing magnesium as the anode material are disclosed in a paper by R. C. Kirk and A. B. Fry, "Magnesium Dry Cells," published in the "Journal of the Electro-chemical Society," vol. 94, No. 6, pages 277 to 289, inclusive.

In making up magnesium primary cells, as mentioned in U. S. Patent No. 2,616,940, "the usual procedure is to form the anode material into a cup or 'battery can' which constitutes one of the electrodes of the cell as well as the container holding the cathode elements and the electrolyte. The cathode mix consists of manganese dioxide having intimately mixed with it usually between about 5 and 15 percent of finely divided carbon, such as acetylene black, by weight. The mixture is moistened with enough electrolyte to make it moldable and the moldable mixture is formed into 'bobbins' around a central electrode in the form of a rod of carbon or graphite. These bobbins are usually cylindrical moldings somewhat smaller than the battery can and are inserted into the cans after the cans are lined with starch paste or gelled electrolyte or a porous nonconductor, such as cloth or paper, to keep the bobbin from touching the can. In some instances the cathode mix is introduced into the lined cans without previously forming the cathode mix into a bobbin, the molding taking place in the lined can. In such instances, after placing the cathode mix in the can, the carbon or graphite rod is pushed centrally into the cathode mix as the other electrode."

Similar dry cell formulations are disclosed in U. S. Patent 2,547,907 and 2,547,908. U. S. Patent 2,616,940 discloses that in the cells having the foregoing formulations the can or lining may be dispensed with and the cathode mix may be placed directly against the inside of the can or cup in assembling the cell elements.

Dry cells formulated as above described (with or without lining the can) are usually sealed at the top. Sealing is accomplished by placing a cardboard or similar porous dielectric washer in the top of the can over the end of the carbon rod a short distance above the cathode mix. Then a layer of sealing compound, such as a rosin-base sealing wax, coal tar or asphalt pitch, is poured over the washer so as to fill the annular space at the top of the can above the washer.

While dry cells made in the above described manner give excellent performance, they are not of the so-called leak proof variety which are in wide demand as flashlight batteries. Also, the use of a magnesium cup anode is uneconomical from the standpoint of the bobbin size and amount of electrolyte contained in the cell. That is, an un-balance of materials exists because the can or cup anode of the flashlight cell cannot hold enough cathode mix and electrolyte to completely consume a cup shaped extruded anode during the useful life of the cell.

In the above described primary cells the magnesium cup serves both as the anode and the container of the cell. Since the walls or bottom of the container cup should not be punctured during the life of the cell if leakage is to be prevented, the cup requires considerably more metal than would be required if the magnesium were used only as a consumable anode.

It has therefore been found practicable to build cells in which the container is a steel cup and the anode is a cylindrically-shaped section of a magnesium sheet material which fits closely within the steel cup and is welded thereto.

Although the magnesium cathodically protects the steel can against corrosion, the use of the anode material for this purpose is un-economical. A possible solution is to coat the inner walls of the steel can with a hard, fluid impervious material such as lacquer, but this does not prevent attack of the back of the anode by the electrolyte which seeps between the anode and the wall of the container.

Further, the welded connection between the can and the anode is not inexpensive to make, especially when two or three welds are usually made to insure good electrical contact between the anode and cup after much of the anode is consumed.

A principal object of this invention is to provide an improved dry cell of the so-called leak-proof variety which has a long useful life, high output voltage and efficiency, and is economical to manufacture.

In accordance with this invention, there is provided a primary cell having a steel cup or container in which is disposed a hollow, cylindrically shaped magnesium anode of slightly smaller diameter than the can. The inner wall of the can and the juxtaposed surface of the anode are covered with and joined together by a fluid impervious grease which contains particles of metal in sufficient number to render the greasy mixture electrically conductive. Thus the inner wall of the can and the back side of the anode are protected against corrosion and are electrically also connected together without the need of a welded connection by the electrically conductive grease mixture.

Figure 2:
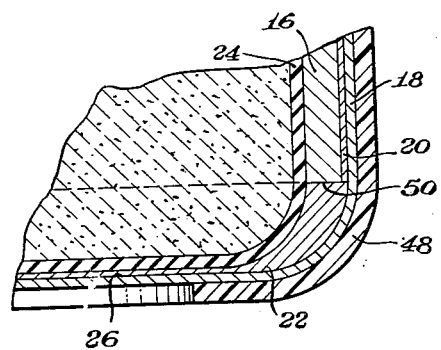

The invention, as well as additional objects and advantages thereof, will best be understood when the following detailed description is read in connection with the accompanying drawings, in which;

Fig. 1 is a side elevational view, partly in section, of a primary cell made in accordance with this invention, and Fig. 2 is a fragmentary view, on an enlarged scale and in section, of the lower part of the cell shown in Fig. 1.

Referring to the drawings, there is shown a primary cell, indicated generally by the numeral 10, comprising a cathode electrode 12, cathode mix 14 including electrolyte, and a tubular shaped magnesium anode 16 encased in a steel can 18.

The bottom of the can 18 is coated with an insulating material 22, such as grease, oil, or lacquer. The cathode mix is contained in a paper separator bag 24 which fits within the anode 16 and rests on the insulating material at the bottom of the can 18. The cathode electrode 12, which is a carbon or graphite rod within the bag 24, is axially disposed with respect to the can 18. The lower end of the electrode rod 12 lies against the bottom of the paper bag 24 and is insulated from the bottom 26 of the can or cup 18 by the bag 24 and the coating 22 of grease or oil.

The top 28 of the cathode terminal electrode 12 extends above the top of the steel can 18 and is held in position by a somewhat hat-shaped cover plate 30 whose periphery or "brim" 32 extends to and is insulated from the turned in upper end 34 of the steel can 18. Insulation between the can 18 and cover plate 30 is provided by a paper ring or annulus 36 which separates the two parts.

The magnesium anode 16 extends about ⅔ of the length of the steel can 18.

The cathode mix 14 extends between the carbon rod 12 and the anode 16. The mix 18 is in direct contact with the carbon rod 12 but is separated from direct contact with the anode 16 by the paper bag 24 in which the mix is contained. The cathode mix 14 extends to or near to the top 38 of the anode 16, and the upper wall 40 of the paper separator bag 24 is turned in towards the carbon rod 12 to help prevent the spilling of cathode mix 14 directly onto the anode 16.

A tar seal 42 is provided between the carbon rod 12 and the steel cup 18. An apertured paper washer 44 is fitted between the carbon rod 12 and the can 18 to provide the base on which the tar seal 42 is poured. A paper tab 46 extending upwardly from the washer 44 through the tar seal 42 provides the means by which gas generated within the cell 10 while current is drawn therefrom is vented to the upper portion of the cell which is not sealed in a gas tight manner. Alternatively, a porous carbon rod 12 may be used to vent gases from the cell. In such cases the cover plate 30 usually contains a small aperture adjacent to the rod 12.

The volume between the top of the anode 16 and the seal 42 is needed because gases may be generated within the cell at a faster rate than they may be vented through the tab 46. The additional space between the tar seal 42 and the cover plate 30 is provided in order that a specific cell dimension may be maintained, e. g., a standard length flashlight cell as established for zinc anode type cells.

In order that two or more of the cells 10 will not short out when connected in series in a metal cased flashlight, an insulating plastic coating 48 is provided on the side walls and part of the ends of the can 18. It should be emphasized that the insulating coating may be dispensed with if the cells are to be used in parallel or even if connected in series if the cells are used in an electrically non-conductive container.

In accordance with the invention, electrical contact between the anode 16 and the cup or can 18 is achieved by providing a layer 20 of electrically conductive grease between the can 18 and the anode 16.

The layer 20 is composed of grease plus finely divided metal particles and, although electrically conductive, is substantially a fluid impervious layer. The layer adheres to both the walls of the can 18 and the anode 16, and substantially fills the space therebetween, thus preventing corrosion of either part by electrolyte which would otherwise rise between the anode 16 and the can 18.

The conductive coating eliminates the need for a welded electrical connection between the anode 16 and can 18. Further, because substantially all the "back" side of the anode 16 is in contact with the conductive layer 20, the cell may be operated until the anode 16 is completely consumed. (Of course, it will be realized that the amount of anode consumption is dependent also upon the amount of cathode mix 14 contained in the cell 10.)

When the term "grease plus finely divided metal particles" is used herein, "grease" is intended to include grease-like silicone compounds such as silica filled dimethyl siloxane fluids and the like as well as petroleum jelly and other "grease-like" materials.

Formulations of suitable electrolytes and dry mixes for dry cells having magnesium for the anode material are disclosed in the aforementioned U. S. Patents 2,547,907, 2,547,908, 2,606,940, and paper by Kirk and Fry.

The anode 16 in a specific cell made in accordance with this invention is composed of AZ31A alloy sheet of .030 wall thickness rolled to form a cylinder 1.25 inches in diameter and 1.5 inches high. In addition to magnesium, AZ31A alloy contains nominally 3 percent aluminum, 1 percent zinc and about .15 percent calcium. The anode cylinder 16 fits closely within the drawn steel can 18 with the bottom edge 50 of the anode 16 at or near to the bottom 26 of the can 18. The edges of the anode sheet which are in juxtaposition with each other are usually separated by .005 inch or less in order to prevent an excessive amount of electrolyte from passing between the juxtaposed edges (shown as the dotted line 52 in Fig. 1) and being dispersed between the anode 16 and the cup 18.

An example of a suitable electrically conductive material for use as the conductive layer 20 is a mixture of magnesium-aluminum eutectic and silica filled dimethyl siloxane fluid, the eutectic comprising about 50 percent, by weight, of the mixture.

Zinc particles or other metallic particles such as magnesium and aluminum particles of 300–350 mesh fineness, may be mixed either with silicone type materials or with ordinary cup grease, for example. The metal powder will comprise between 25 percent and 60 percent, by weight, of the mixture. The exact composition of the conductive mixture used will depend on the required electrical resistance of the coating or the stiffness of coating which may be applied under particular circumstances.

The coating 20 may be applied either to the interior wall surfaces of the can 18 or to one side of the anode 16, as desired. It is sometimes desirable, after a cell is assembled, to quickly heat the can 18 to assure that the grease-like coating flows sufficiently to fill in small areas or streaks of metal which may have been rubbed clear of any coating when the cell was assembled. Such heating of the can 18 or the cell 10 may conveniently be accomplished by radio frequency heating means.

What is claimed is:

1. A primary cell comprising a steel cup of tubular cross-sectional configuration and which is a terminal electrode of said cell, the side wall of said cup being substantially perpendicular to the bottom of said cup, a hollow, cylindrically shaped magnesium anode disposed within said cup and having one side in close fitting relationship with the side wall of said cup, the lower part of said anode being disposed at least near to the bottom of said cup, the inner surface of said cup below the anode being coated with an electrically insulating coating, a layer of electrically conductive tightly adhering material disposed between and adhering to the juxtaposed surfaces of the anode and the cup, a cathode electrode disposed in said cup, the cathode electrode being insulated from the bottom of the cup, and a cathode depolarizing mixture comprising manganese dioxide and carbon black moistened with an aqueous electrolyte, the mixture being interposed between the cathode electrode and the anode.

2. A primary cell comprising a steel cup of tubular cross-sectional configuration and which is a terminal electrode of said cell, the side wall of said cup being substantially perpendicular to the bottom of said cup, a hollow, cylindrically shaped magnesium anode disposed within said cup and having one side in close fitting relationship with the side wall of said cup, the lower part of said anode being disposed at least near to the bottom of said cup, the inner surface of said cup below the anode being coated with an electrically insulating coating, a layer of electrically conductive material having a grease-like base disposed between and adhering to the juxtaposed surfaces of the anode and the cup, a cathode electrode disposed in said cup, the cathode electrode being insulated from the bottom of the cup, and a cathode depolarizing mixture comprising manganese dioxide and carbon black moistened with an aqueous electrolyte, the mixture being interposed between the cathode electrode and the anode.

3. A primary cell in accordance with claim 2, wherein said electrically conductive layer comprises metal particles dispsersed in a grease-like base material.

4. A primary cell in accordance with claim 2, wherein said electrically conductive layer is composed of from 25 percent to 60 percent, by weight, of metal particles of at least 300 mesh fineness and 75 percent to 40 percent, by weight of a silica filled dimethyl siloxane fluid.

5. A primary cell in accordance with claim 4, wherein said metal particles are magnesium and aluminum particles.

6. A primary cell in accordance with claim 4, wherein said metal particles are zinc particles.

7. A primary cell comprising a drawn steel cup of tubular cross-sectional configuration and which is a terminal electrode of said cell, the side wall of said cup being substantially perpendicular to the bottom of said cup, a hollow, cylindrically shaped magnesium anode disposed within said cup and having one side in close fitting relationship with the side wall of said cup, the lower part of said anode being disposed at least near to the bottom of said cup, the inner surface of said cup below the anode being coated with an electrically insulating coating, a layer of electrically conductive fluid impervious mixture of grease and finely divided magnesium and aluminum particles disposed between and adhering to the juxtaposed surfaces of the anode and the cup, a cathode electrode disposed in said cup, the cathode electrode being insulated from the bottom of the cup, and a cathode depolarizing mixture comprising manganese dioxide and carbon black moistened with an aqueous electrolyte, the mixture being interposed between the cathode electrode and the anode.

References Cited in the file of this patent

UNITED STATES PATENTS

| | | |
|---|---|---|
| 2,198,423 | Anthony | Apr. 23, 1940 |
| 2,434,703 | Koppelman | Jan. 20, 1948 |
| 2,705,253 | Kirkman | Mar. 29, 1955 |